United States Patent

Overwien et al.

[15] 3,697,580

[45] Oct. 10, 1972

[54] PRODUCTION OF BUTEN-2-OL-4 COMPOUNDS

[72] Inventors: Hermann Overwien, Ludwigshafen; Herbert Mueller, Frankenthal, both of Germany

[73] Assignee: Badische Anilin- & Soda-Fabrik Aktiengesellschaft, Ludwigshafen/ Rhine, Germany

[22] Filed: Jan. 9, 1970

[21] Appl. No.: 1,889

[30] Foreign Application Priority Data

Jan. 15, 1969 Germany..........P 19 01 709.5

[52] U.S. Cl............260/468 R, 260/469, 260/476 R, 260/598, 260/599, 260/600, 260/602, 260/611 R, 260/612 D, 260/612 R, 260/614 AA, 260/617 R, 260/642

[51] Int. Cl.....C07c 43/14, C07c 47/26, C07c 67/00

[58] Field of Search......260/491, 642, 617 R, 611 R, 260/614 AA, 598, 599, 468 R, 476 R, 469, 600, 602, 612 R, 612 D

[56] References Cited

UNITED STATES PATENTS 3,344,171 9/1967 Lemberg...................260/489

*Primary Examiner*—Vivian Garner
*Attorney*—Johnston, Root, O'Keeffe, Keil, Thompson & Shurtleff

[57] ABSTRACT

Production of buten-2-ol-4 compounds by isomerization of buten-1-ol-4 compounds in the presence of palladium or a compound thereof and hydrogen. The products are solvents or starting materials for the production of solvents, dyes, surface coatings and pest control agents.

7 Claims, No Drawings

PRODUCTION OF BUTEN-2-OL-4 COMPOUNDS

The invention relates to a process for the production of buten-2-ol-4 compounds by isomerization of buten-1-ol-4 compounds in the presence of palladium or a palladium compound and hydrogen.

It is known for Tetrahedron Letters, 20 2,911 et seq. (1964) that in the presence of N-lithiumethylenediamine as a catalyst, allyl carbinol is partly isomerized into crotyl alcohol. It is also known that unsaturated alcohols can be isomerized in the presence of carbonyls of metals of group VIII of the Periodic System of Elements as catalysts. This method has the disadvantage however that numerous byproducts and secondary products, for example corresponding aldehydes, are obtained in the isomerization (Chem. Commun., 97 to 99 (1968), J. Amer. Chem. Soc., 85 1549 (1963)).

The isomerization can be carried out purely thermally without using catalysts (Can.J.Chem., 46, 2225 (1968)), but usually very high temperatures have to be used and this results in partial resinification of the starting compound.

An object of this invention is a new and more economical process for producing buten-2-ol-4 in a better yield and purity.

This and other objects are achieved and buten-2-ol-4 having the general formula:

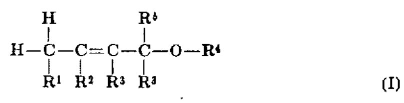

where the individual radicals $R^1$, $R^2$, $R^3$, $R^4$ and $R^5$ may be identical or different and each denotes a hydrogen atom or an aliphatic radical, $R^2$ may also denote a radical —CHO, $R^2$ and $R^5$ together with the carbon atoms situated between them may also be members of an alicyclic ring and/or $R^4$ may also denote a cycloaliphatic, araliphatic or aromatic radical, or the radical $$-\overset{\overset{O}{\|}}{C}-R^6$$

where $R^6$ denotes an aliphatic, cycloaliphatic, araliphatic or aromatic radical, can be obtained advantageously by isomerization of unsaturated alcohols by isomerizing a buten-1-ol-4 compound having the general formula:

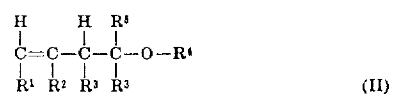

where $R^1$, $R^2$, $R^3$, $R^4$ and $R^5$ have the meanings given above in the presence of hydrogen and of palladium and/or a compound of palladium.

The reaction may be represent in the case when 2-methylbuten-1-ol-4 is used by the following equation:

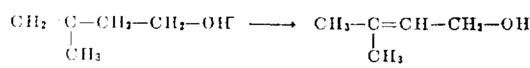

Contrasted with the said prior art methods, the process according to this invention give buten-2-ol-4 by a more economical method in better yields and higher purity.

Buten-1-ols-4 or their esters or ethers are used as starting materials having the general formula (II). Preferred starting materials (II) (and consequently preferred end products (I)) are those in whose formulas the individual radicals $R^1$, $R^2$, $R^3$, $R^4$ and $R^5$ are identical or different and each denoted a hydrogen atom or an alkyl radical having one to six carbon atoms, $R^2$ may also denote the radical —CHO, $R^2$ and $R^5$ together with the carbon atoms lying between them may also denote members of a five-membered, six-membered or seven-membered alicyclic ring and/or $R^4$ may also denote a cycloalkyl radical having five to seven carbon atoms, an aralkyl radical having seven to 12 carbon atoms, a phenyl radical, a naphthyl radical or the radical $$-\underset{\underset{O}{\|}}{C}-R^6$$

where $R^6$ denotes an alkyl radical having one to six carbon atoms, a cycloalkyl radical having five to seven carbon atoms, an aralkyl radical having seven to 12 carbon atoms, a phenyl radical or a naphthyl radical. The said radicals may also bear groups and/or atoms which are inert under the reaction conditions, for example ether groups, as substituents.

For example the following buten-1-ol-4 compounds may be used as starting materials (II):

buten-1-ol-4; 2-methylbuten-1-ol-4; 1-formylbuten-1-ol-4; 2,3,4-trimethylbuten-1-ol-4; 3-isobutylbuten-1-ol-4; 4-hexylbuten-1-ol-4; 1-methylene-3-methylcyclohexanol-3; 1-methylene-2-ethylcyclopentanol-3; 1-methylenecyclohexanol-3; 1-methylenecycloheptanol-3; and analogous ethyl, cyclohexyl, benzyl, phenyl or α-naphthyl ethers and acetic, cyclohexanecarboxylic, benzoic, α-naphthoic and dihydrocinnamic esters.

The reaction is carried out in the presence of palladium or a compound of palladium, generally in an amount of 0.01 to 5 percent by weight, preferably 0.1 to 2 percent by weight, of palladium as finely divided metal and/or calculated as palladium in the form of its finely divided compounds, with reference to starting material (II). For example palladium black, palladium powder, or palladium bromide, arsenide, cyanide, chloride, nitrate, iodide, oxide, sulfide or sulfate or complex salts such as tetrachloropalladates, tetraminepalladium chloride, diamine palladium chloride or hexachloropalladates may be used as isomerization catalysts. The said catalysts may advantageously be applied in the conventional way to carriers, for example active carbon, barium sulfate, silica gel or zeolites, and the resultant supported catalysts used for the isomerization. Production of such supported catalysts may be carried out in any way, for example by impregnation of the carrier with the appropriate solution of a palladium salt, or by kneading or mixing while grinding the components. Reference is made to Houben-Weyl, "Methoden der organischen Chemie," volume 4/2, pages 137 et seq, for details of the production of the catalysts, particularly supported catalysts.

The reaction is carried out in the presence of hydrogen, generally in an amount of 1 to 25 mole percent, preferably 5 to 50 mole percent, with reference to starting material (II). Hydrogen may be supplied continuously or intermittently to the reaction and/or the catalyst itself may be freshly loaded with hydrogen after a certain reaction period. As a rule the starting material is isomerized at a temperature of from 0° to 250°C, preferably from 30° to 150°C, at atmospheric or superatmospheric pressure, for example up to 50 atmospheres, continuously or batchwise. Organic solvents which are inert under the reaction conditions such as ethers, for example diethyl ether, dioxane or tetrahydrofuran; alkanols, for example ethanol or isobutanol; aromatic or aliphatic hydrocarbons, for example heptane or benzene; or appropriate mixtures thereof may be used if desired. Solvents which under the reaction condition serve as hydrogen donors and are themselves dehydrogenated in the process, such as derivatives of cyclohexane, for example cyclohexenol or tetrahydroacetophenone, may also be used.

Isomerization may be carried out as follows: the starting material (II) and the catalyst, with or without a solvent, are kept for 15 minutes to 6 hours at the reaction temperature in the presence of hydrogen. The end product is then separated from the mixture by a conventional method, for example by fractional distillation.

The compounds which can be prepared by the process according to the invention are solvents and valuable starting materials for the production of solvents, dyes, surface coatings and pesticides.

Reference is made to U.S. Patent No. 2,011,317 and Neftekhimiya, volume 4 (1964), pages 609 to 617 (part 4) as regards the use of the end products.

The Examples illustrate the invention.

Parts given in the following Examples denote parts by weight. They bear the same relation to parts by volume as the kilogram to the liter.

EXAMPLE 1

A mixture of 344 parts of 2-methylbuten-1-ol-4 and 1 part of palladized carbon 10 percent by weight of palladium) has 4,000 parts by volume of hydrogen passed into it with efficient stirring. The mixture is then heated for 6 hours at refluxing temperature (125° to 130°C) and the end product is separated by fractional distillation. 214 parts of 2-methylbuten-2-ol-4 is obtained having a boiling point of 141°C at 760 mm. This is equivalent to 95 percent of the theory with respect to reacted starting material and 70 percent of the theory with respect to starting material used.

EXAMPLE 2 salt 4,000 parts by volume of hydrogen is passed with efficient stirring into a mixture of 355 parts of buten-1-ol-4 and 0.5 part of palladized carbon (10 percent by weight of palladium). The mixture is then heated for 4 hours at 110°C. The end product is separated by fractional distillation. A mixture of 160 parts of buten-1-ol-4 and 181 parts of buten-2-ol-4 (crotyl alcohol) is obtained. The latter is separated from the starting material by distillation at 97°C at 300 mm; the yield is 93 percent of the theory with reference to reacted starting material and 51 percent of the theory with reference to starting material used.

EXAMPLE 3

150 parts of 2-methylbuten-4-ol-4 acetate and 0.5 part of palladized charcoal are heated for 2.5 hours at 147°C with vigorous stirring while at the same time 2,500 parts by volume of hydrogen is metered in continuously. The end product is separated by fractional distillation. 105 parts of prenyl acetate (2-methylbuten-2-ol-4-acetate) having a boiling point of 158°C is obtained. This is a yield of 95 percent of the theory with reference to starting material reacted and 70 percent of the theory with reference to starting material used.

EXAMPLE 4

310 parts of 1-methylene-3-methylcyclohexanol-3 is subjected to an isomerization reaction in the manner described in Example 1. 260 parts of 1,4-dimethylcyclohexen-1-ol-3 having a boiling point of 173°C is obtained. This is a yield of 90 percent of the theory with reference to starting material reacted and 84 percent of the theory with reference to starting material used.

EXAMPLE 5

150 parts of 2-methylene-4-acetoxybutanal-1 is subjected to an isomerization reaction analogously to Example 1. 45 parts of 2-methyl-4-acetoxy-2-1al having a boiling point of 52°C at 30 mm is obtained. This is a yield of 30 percent of the theory with reference to starting material used.

We claim:

1. A process for the production of buten-2-ol-4 compounds having the formula:

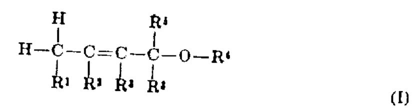

where the individual radicals r[1], $R^2$, $R^3$, $R^4$ and $R^5$ may be identical or different and each denotes a hydrogen atom or an alkyl radical of one to six carbon atoms, $R^2$ may also denote the radical —CHO, $R^2$ and $R^5$ together with the carbon atoms lying between them may also denote members of a five-membered, six-membered or seven-membered alicyclic ring and/or $R^4$ may also denote a cycloalkyl radical of five to seven carbon atoms, a hydrocarbon aralkyl radical of seven to 12 carbon atoms, a phenyl radical, a naphthyl radical or the radical $$-\underset{\underset{O}{\|}}{C}-R^6$$

where $R^6$ denotes an alkyl radical of one to six carbon atoms a cycloalkyl radical having five to seven carbon atoms, a hydrocarbon aralkyl radical of seven to 12 carbon atoms, a phenyl radical or a naphthyl radical by isomerization of an unsaturated alcohol in the presence of a catalyst at a temperature of 0° to 250° C wherein a buten-1-ol-4 compound having the formula:

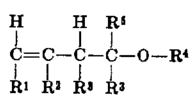

(II)

where $R^1$, $R^2$, $R^3$, $R^4$ and $R^5$ have the meanings given is isomerized in the presence of palladium metal or a palladium salt and hydrogen.

2. A process as in claim 1 wherein the isomerization is carried out in the presence of palladium in an amount of 0.01 to 5 percent by weight of palladium as a finely divided metal or calculated as palladium in the form of a finely divided palladium salt, with reference to starting material (II).

3. A process as in claim 1 wherein the isomerization is carried out in the presence of palladium in an amount of 0.1 to 2 percent of palladium as finely divided metal or calculated as palladium in the form of a finely divided palladium salt with reference to starting material (II).

4. A process as in claim 1 wherein the isomerization is carried out in the presence of hydrogen in an amount of 1 to 25 mole percent with reference to starting material (II).

5. A process as in claim 1 wherein the isomerization is carried out in the presence of hydrogen in an amount of 5 to 50 mole percent with reference to starting material (II).

6. A process as in claim 1 wherein the isomerization is carried out at a temperature of from 30° to 150°C.

7. A process as in claim 1 wherein the isomerization is carried out in the presence of an organic solvent which is inert under the reaction conditions.

* * * * *